US009144802B2

(12) United States Patent
Rees et al.

(10) Patent No.: US 9,144,802 B2
(45) Date of Patent: Sep. 29, 2015

(54) SYSTEM AND METHOD FOR RECLAIMING WASTE CARPET MATERIALS

(71) Applicant: Shaw Industries Group, Inc., Dalton, GA (US)

(72) Inventors: John J. M. Rees, Chattanooga, TN (US); Edward Huitt, Ringgold, GA (US); Leonard Lee Hixon, Jr., Lookout Mountain, GA (US); Christopher Scott Sirmans, Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 321 days.

(21) Appl. No.: 13/669,197

(22) Filed: Nov. 5, 2012

(65) Prior Publication Data

US 2013/0112790 A1   May 9, 2013

Related U.S. Application Data (60) Provisional application No. 61/555,241, filed on Nov. 3, 2011.

(51) Int. Cl.
| | |
|---|---|
| *B02C 23/14* | (2006.01) |
| *B02C 18/00* | (2006.01) |
| *B29B 17/02* | (2006.01) |
| *B29B 17/04* | (2006.01) |
| *B29L 31/00* | (2006.01) |
| *B29K 9/06* | (2006.01) |
| *B29K 23/00* | (2006.01) |
| *B29K 105/26* | (2006.01) |

(52) U.S. Cl.
CPC ............. *B02C 18/0084* (2013.01); *B02C 23/14* (2013.01); *B29B 17/02* (2013.01); *B29B 17/04* (2013.01); *B29B 2017/0217* (2013.01); *B29B 2017/0424* (2013.01); *B29K 2009/06* (2013.01); *B29K 2023/12* (2013.01); *B29K 2105/26* (2013.01); *B29L 2031/7322* (2013.01); *Y02W 30/622* (2015.05)

(58) Field of Classification Search
CPC   B02C 18/28; B02C 19/0056; B02C 2201/00; B02C 18/00; B02C 23/14; B02C 18/0084
USPC ............ 241/24.1, 24.19, 29, 158, 160, 68, 33
See application file for complete search history.

(56) References Cited

U.S. PATENT DOCUMENTS

| | | | |
|---|---|---|---|
| 2,750,059 A | 6/1956 | Otto | 414/502 |
| 4,018,391 A | 4/1977 | Jacobsen | 241/152.2 |
| 4,067,506 A | 1/1978 | Cerroni | 241/200 |
| 5,551,825 A | 9/1996 | Montgomery | 414/412 |
| 5,964,563 A | 10/1999 | Bielagus | 414/412 |

(Continued)

OTHER PUBLICATIONS

U.S. Appl. No. 61/466,788, filed Mar. 23, 2011, Rees (Shaw Industries Group).

(Continued)

*Primary Examiner* — Mark Rosenbaum
(74) *Attorney, Agent, or Firm* — Ballard Spahr LLP (57) ABSTRACT

The present invention relates generally to the reclaiming of carpet waste material. More particularly, the invention relates to a method and system for reclaiming carpet components such as yarn, tufting primary, binder, and secondary backing from post industrial and post consumer carpet waste in a substantially continuous flow process.

43 Claims, 7 Drawing Sheets

(56) References Cited

U.S. PATENT DOCUMENTS

| | | | |
|---|---|---|---|
| 6,029,916 A * | 2/2000 | White | 241/24.19 |
| 6,227,468 B1 | 5/2001 | De Baat | 241/30 |
| 6,966,512 B1 | 11/2005 | Simpson | 241/200 |
| 7,784,719 B1 * | 8/2010 | Wingard | 241/20 |
| 2009/0017253 A1 * | 1/2009 | Bell | 428/87 |
| 2013/0327858 A1 | 12/2013 | Rees | |

OTHER PUBLICATIONS

U.S. Appl. No. 61/555,241, filed Nov. 3, 2011, Rees (Shaw Industries Group).

U.S. Appl. No. 14/575,503, filed Dec. 18, 2014, Rees (Shaw Industries Group).

U.S. Appl. No. 61/602,348, filed Feb. 23, 2012, Rees (Shaw Industries Group).

U.S. Appl. No. 14/596,750, filed Jan. 14, 2015, Rees (Shaw Industries Group).

Non-Final Office Action issued on Jan. 28, 2015 for U.S. Appl. No. 13/776,583 published as US 2013/0327858 (Applicant: Shaw Industries Group // Inventor: Rees et al.) (6 pages).

Response to Requirement for Restriction filed Dec. 29, 2014 for U.S. Appl. No. 13/776,583 published as US 2013/0327858 (Applicant: Shaw Industries Group // Inventor: Rees et al.) (7 pages).

Requirement for Restriction issued Oct. 28, 2014 for U.S. Appl. No. 13/776,583 published as US 2013/0327858 (Applicant: Shaw Industries Group // Inventor: Rees et al.) (6 pages).

* cited by examiner

SYSTEM AND METHOD FOR RECLAIMING WASTE CARPET MATERIALS

CROSS-REFERENCE TO RELATED APPLICATION

This application claims the benefit of priority to U.S. Provisional Patent Application Ser. No. 61/555,241, filed on Nov. 3, 2011, the entire disclosure of which is incorporated by reference herein for all purposes.

FIELD OF THE INVENTION

The present invention relates generally to the reclaimation of carpet waste material. More particularly, the invention relates to a method and system for reclaiming carpet components such as yarn, tufting primary and secondary backing for recycling.

BACKGROUND OF THE INVENTION

Waste material inflow into resource limited landfills is strained by the voluminus amount of post consumer carpet waste produced by carpet distributors and carpet installation contractors and post industrial carpet waste produced by carpet manufacturers. Post industrial carpet waste can include, for example, commercial, industrial and residential carpet waste; manufacturing remnants; quality control failures, and the like. Post consumer carpet waste can be, for example, used carpet, e.g., carpet removed from a home, apartment complex, or a commercial installation, or unused carpet, e.g., residual carpet left from an installation or manufacturing process. While most estimates indicate that carpet waste constitutes only 1 to 2% of all municipal solid waste, this amount still represents a vast quantity of waste that can have a substantial economic and environmental impact.

The carpet waste inflow into landfills is not generally environmentally beneficial. In an effort to mitigate the amount of carpet waste that is shipped to landfills, efforts are being made to manually recycle at least a portion of the carpet waste prior to insertion into the landfill waste stream. Recycling carpet, however, is difficult because its major components are chemically and physically diverse.

Most carpets comprise about 20-50 percent weight face fiber, the remainder being backing materials, commonly polypropylene, and an adhesive which attaches the carpet fiber to the backing material. The adhesive typically comprises a carboxylated styrenebutadiene (XSB) latex copolymer, and inorganic filler like calcium carbonate. These materials are frequently incompatible with each other in a recycling operation. For example, the means used to separate and reuse a layer of the backing material might affect the usefulness of the pile material. Alternatively, a chemical used in the recycling process might dissolve two or more of the components, causing them to intermix and form a blend of the two materials having less desirable properties. The application of heat to melt certain materials can have the same effect. Because of these difficulties, to date the amount of carpet reclaimed through recycling operations is limited and only a minimal percentage of the total carpet waste may be useful in the production of green technology products. Accordingly, there is a need for efficient recycling of post industrial and post consumer carpet waste to reduce the amount of waste being disposed of at landfills.

In light of the various shortcomings of prior attempts to effectively recycle spent carpeting, a need is recognized for a system and method capable of effectively and efficiently separating the constituent materials of used carpeting, so that those materials can be effectively recycled into new product with a minimum of discarded material and a minimum need to add virgin material to reduce contamination levels.

A further need is recognized for a scheme that makes effective and efficient use of the reclaimed materials in new carpeting. The need for virgin material should be kept to a minimum, in order to decrease costs and increase the amount of old material that is converted into new carpeting. In addition, such broadbased recycling methods can also potentially help to comport with National Sanitation Foundation (NSF) 140/2007 recommendations, which encourage carpet industries to develop sustainable carpet manufacturing and recycling programs for social, economic, and environmental benefits.

SUMMARY

The present system and method is capable of reclaiming heterogeneous carpet waste materials from streams of post industrial and/or post consumer carpet waste at higher levels of efficiency and lower levels of contamination than have previously been accomplished. To accomplish this, the invention provides a method and system for reclaiming carpet components such as yarn, tufting primary, binder, and secondary backing in a substantially continuous flow process.

As discussed above, carpet materials typically have several layers of different materials. The simplest types of carpet might have fibrous pile material (nylon, for example) fused directly to a thermoplastic primary backing material. However, there can also be a secondary binder or substrate layer, a reinforcing web material through which the pile is attached, or a separate glue material that is used to anchor the pile to the backing. The present invention is operative to separate the constituent materials, so that the separate types of materials can be recycled.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

These and other features of the preferred embodiments of the invention will become more apparent in the detailed description in which reference is made to the appended drawings wherein.

DETAILED DESCRIPTION

The present invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "waste stream" can include two or more such waste streams unless the context indicates otherwise.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Without the use of such exclusive terminology, the term "comprising" in the claims shall allow for the inclusion of any additional element — irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term carpet is used to generically include broadloom carpet, carpet tiles, and even area rugs. To that "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

The present invention may be understood more readily by reference to the following detailed description of preferred embodiments of the invention and the examples included therein and to the Figures and their previous and following description.

Figure 1:
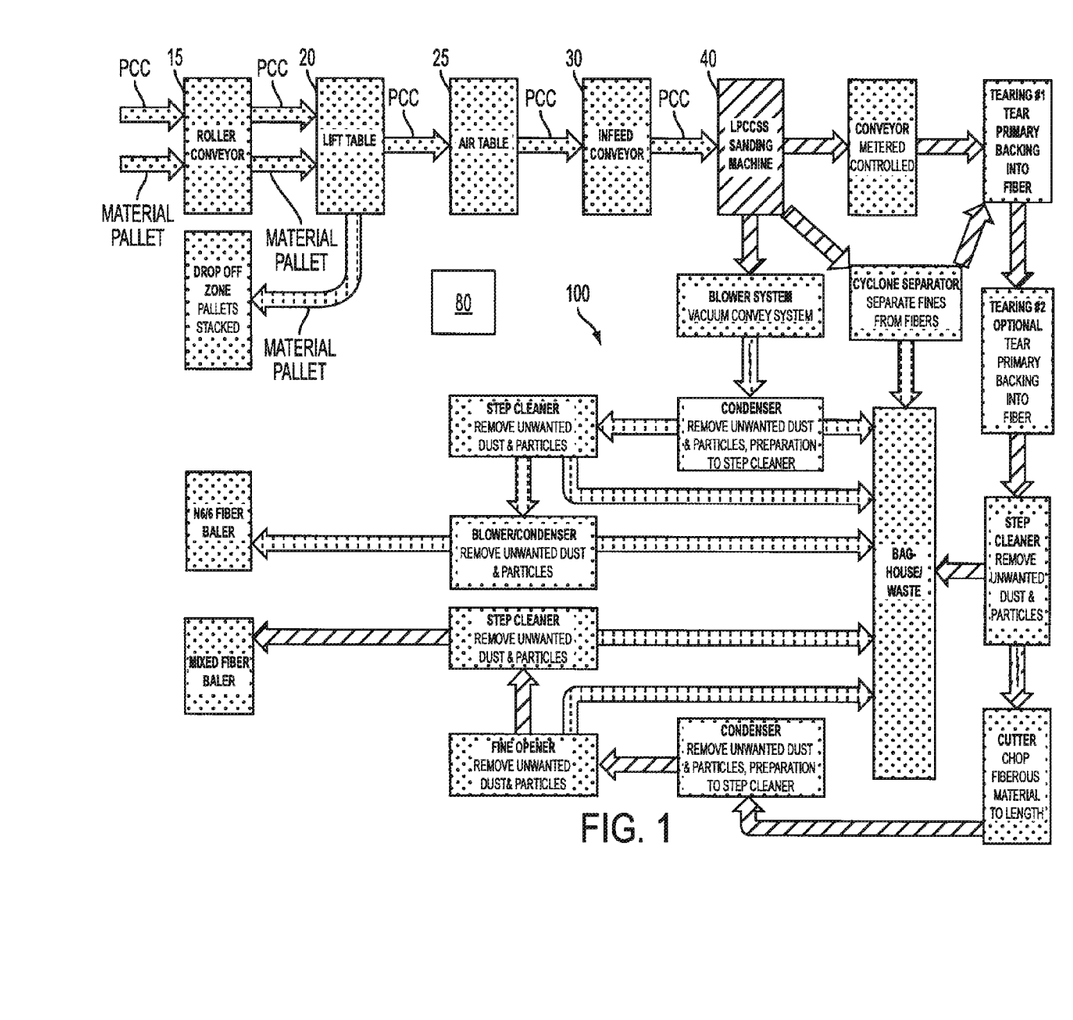
FIG. 1 is a block diagram illustrating the steps performed in the separation stage of a carpet waste reclaimation system.

FIG. 1 schematically illustrates a carpet waste reclamation method and system 100 according to one aspect of the present invention. As shown, carpet waste 10 is provided, such as the exemplary post consumer carpet illustrated. However, it is contemplated that the carpet waste can be derived from any carpet. In one aspect, and without limitation, the carpet waste can be a postconsumer carpet, post-consumer processed, for example, carpet carcasses, and postindustrial, for example, selvedge, seams, and the like. It is contemplated that the carpet waste can also comprise manufacturing remnants, quality control failures, and the like. In a further aspect, carpet waste can comprise a carpet waste that would otherwise be discarded or landfilled by a consumer, distributor, retailer, installer, and the like.

The carpet waste 10 can be derived from any desired carpet structure, including without limitation, tufted carpet, needle-punched carpet, and even hand woven carpet. In another aspect, the system and method described herein can be used in connection with broadloom carpets, carpet tiles, and even area rugs, so long as the carpet structure comprises at least one inorganic component desired for reclamation. In one aspect, a typical conventional carpet waste structure comprises fiber bundles, a primary backing material, an optional pre-coat layer, an adhesive backing material, an optional reinforcing layer, and an optional secondary backing material. In the present invention, it is contemplated that the carpet waste will be deconstructed or reclaimed into three primary waste streams, a face material or face fiber waste stream, a backing material having some degree of face fiber waste stream, and a primary backing waste stream, In one aspect, the carpet waste can comprise an inorganic filler component. The inorganic filler component can comprise, inter alia, calcium carbonate, calcium sulfate, calcium silicate, magnesium carbonate, magnesium oxide, magnesium hydroxide aluminum trihydrate, alumina, hydrated alumina, aluminum silicate, barium sulfate, barite, flyash, glass cullet, glass fiber and powder, metal powder, clay, silica or glass, fumed silica, talc, carbon black or graphite, fly ash, cement dust, feldspar, nepheline, zinc oxide, titanium dioxide, titanates, glass microspheres, chalk, and mixtures thereof. Among these, preferred fillers comprise calcium carbonate, barium sulfate, talc, silica/glass, alumina, and titanium dioxide, and mixtures thereof. More preferable fillers comprise calcium carbonate.

In another aspect, the filler can be ignition resistant. Exemplary ignition resistant fillers can comprise antimony oxide, decabromobiphenyl oxide, alumina trihydrate, magnesium hydroxide, borates, and halogenated compounds. Of these ignition resistant fillers, those that comprise alumina trihydrate and magnesium hydroxide are preferred.

Carpet waste can be provided to the system 100 in the form of bales. As one will appreciate, baled carpet waste can enhance the ease of the delivery and movement of the carpet waste. Optionally, the carpet waste can be provided to the system 100 palletized or in a loose or otherwise non-compacted condition. In one aspect, it is contemplated that the carpet waste can be provided to the system 100 in a stacked condition. It is also contemplated that landfill owners and/or operators can also provide incentives for stacking or baling of carpet to reduce the volume requirement of the landfill.

Referring back to FIG. 1, once the carpet waste 10 is delivered to the system, the palletized carpet waste is placed in a stacked condition on a roller conveyor 15 and urged onto a lift table 20 that is configured to urge the carpet waste 10 downstream to an air table 25. This system is configured to accept stacked carpet waste pieces and to feed each individual flat piece of carpet waste downstream at a desired rate, in single form with correct orientation. The roller conveyor can be configured with a conventional pressure sensing system for monitoring the supply of delivered carpet waste and a fork truck sensing system. The lift table can be any conventional lift table or device that is capable of separating the stacked carpet waste from the pallets and urging the individual pieces of carpet waste material downstream to the air table. As one will appreciate, the air table can be any conventional air table or device that is capable of separating at least a portion of the contamination materials, such as dirt, present in post consumer carpets from the constituent carpet materials. Any separated contamination materials are recovered for subsequent landfill processing.

After the air table, the carpet waste pieces are conveyed to the infeed conveyor system 30. In one aspect, the infeed conveyor system 30 can comprise a means for removing wrinkles from each individually feed piece of carpet waste 10. It is contemplated that the infeed conveyor system can comprise, without limitation, a sequentially positioned series of one or more of the following: slowed speed rollers or belts, crowned rollers, fluted rollers (bow and skew), driven belts, driven belts at angles, driven rollers at angles, low friction driven belts, high friction driven belts. As one will appreciate, slowed speed rollers or belts can be configured to progressively increase in speed as the material flows downstream through the infeed conveyor system, which dynamically applies force to the individual carpet waste pieces and thereby forcefully pulls out wrinkles in a direction parallel to the downstream machine directional flow. As one will also appreciate, sequentially positioned crowned and fluted bow and skew rollers can be configured to remove wrinkles in the width wise direction. Thus, it is contemplated that the integrated infeed conveyor system can be configured to spread, flatten, and stretch each individual piece of carpet waste. In a further aspect, it is contemplated that each roller can move relatively up or down, i.e., transverse, to the downstream machine directional flow for compliance for thickness or wrinkle presence. In this aspect, it is contemplated that infeed conveyor system can also comprise a means for selectively applying desired pressure in the up or down direction to the individual carpet waste pieces. Optionally, and without limitation, it is contemplated that the means for selectively applying desired pressure can be pneumatic, hydraulic, spring, weighted, and the like.

Subsequent to the infeed conveyor system 30, the flattened individual pieces of carpet waste are feed directly into the component waste separation system 40. In various aspects and referring to FIGS. 2-10, the component waste separation system 40 can comprise at least one of: a tractor feed subsystem 50, an shear subsystem 55, a carpet waste size sensing subsystem 60, a backing thickness sensing subsystem 65, a tuft height and tuft density sensing subsystem 70, and a waste stream output monitoring subsystem 75.

In one aspect, the tractor feed subsystem 50 comprises means for selectively indexing individual flattened pieces of carpet waste through the component waste separation system 40. The means for selectively indexing individual flattened pieces of carpet waste through the component waste separation system 40 is configured to nip the carpet as it is moved in the downstream machine direction to affect the desired control of the orientation and metering of the carpet waste material at a specified rate. In one aspect, the rate can be constant or can be controlled as desired for the respective carpet waste material that is passing therethough the component waste separation system 40.

In one exemplary aspect, the means for selectively indexing individual flattened pieces of carpet waste through the component waste separation system 40 can be a plurality urging elements 52, such as, for example and not meant to be limiting, belts or pin rollers, which are positioned to maintain the individual carpet waste materials in a desired orientation while moving or otherwise urging the carpet waste material through the shear subsystem 55. In one aspect, it is contemplated that the belt can be continuous or segmented across the face of the carpet waste piece. In another aspect, it is also contemplated that the urging elements 52 can have pins, flutes, grooves, high friction surface, grip surface or other conventional profiles for gripping and securing the carpet piece while urging the carpet waste material downstream.

In one aspect, it is contemplated that the plurality of urging elements can comprise two pluralities of urging elements 52', 52". As illustrated, in this embodiment, each plurality of urging elements are positioned substantially parallel to each other and the two pluralities of urging elements can be positioned, at least partially, in opposing, overlapping relationship to each other. It is also contemplated that each plurality of urging elements can also comprise a means for selectively applying desired pressure in the up or down direction, i.e., transverse, to the downstream machine directional flow, to the individual carpet waste pieces in order to maintain the desired nip and to prevent slippage of the individual carpet waste pieces. Optionally, and without limitation, it is contemplated that the means for selectively applying desired pressure can be pneumatic, hydraulic, spring, weighted, and the like.

As shown in FIGS. 2-9, in one aspect, the shear subsystem 55 of the component waste separation system 40 can comprise a plurality of shear subsystems 55. In one aspect, it is contemplated that a first shear subsystem 55' can be configured to contact the incoming carpet waste pieces to remove or otherwise separate the secondary backing materials from the primary backing material of the individual flattened carpet waste pieces. In another aspect, a second shear subsystem 55" can be configured to contact the incoming carpet waste pieces to remove or otherwise separate the face fiber or face materials from the primary backing material of the individual flattened carpet waste pieces.

In various aspects, and as shown in FIGS. 3 and 5-9, the respective number of the first and second shear subsystems 55', 55" can be increased as desired to provide for an overall increase in the throughput of carpet waste pieces through the plurality of shear subsystems 55 of the component waste separation system 40 and to allow for stepped sequential removal of secondary backing material and face fiber/face material as the carpet waste piece is moved downstream through the component waste separation system 40. It is contemplated that the use of such a segmented first and second shear subsystems 55', 55" can improve nipping and carpet control by shearing swathes between respective segmented urging elements 52', 52".

In another aspect, each of the shear subsystems can comprise at least one of a rotating-type shearer, a belt-type shearer, and the like. In one aspect, it is contemplated that each of, or at least one of the shear subsystems, can comprise a conventional blade shear system that is conventionally configured to remove a desired portion of the face fiber/face material as the carpet waste is continuously and linearly moved downstream through the component waste separation system 40.

Optionally, the rotating shearer can be continuous rotating shearer or a segmented rotating shearer. In this aspect, at least a portion of each of the respective rotating or belt-type shearers has a conventional abrasion surface 57, which can be, for example and without limitation, a conventional grit surface that is bonded or otherwise coupled to at least a portion of the exterior surface of the wearer, and the like. It is also contemplated that the abrasion surface can be formed with a series of male flutes having hardened surfaces for extended wear life. In one aspect, the rotating shearer can have a large diameter for increased life and more surface contact.

In another aspect, at least one of the shear subsystems can also comprise means for selectively moving the shear subsystem and/or applying desired pressure in the up or down direction, i.e., transverse, to the downstream machine directional flow, to the individual carpet waste pieces in order to maintain the desired level of the abrasion surface relative to the primary backing of the individual carpet waste pieces. Optionally, and without limitation, it is contemplated that the means for selectively applying desired pressure can be pneumatic, hydraulic, spring, weighted, and the like.

It is contemplated that the speed of each shear subsystem can be variably controlled to reduce fiber wrapping around the rotating shear subsystems and to maximize the abrasion surfaces operational life. In one aspect, the variable control of the speed of each shear subsystem can be selectively controlled in accord with signals received from a computer control system 80, such as, for example and without limitation, a centrally located Programmable Logic Controller, that is in communication with the respective carpet waste size sensing subsystem 60, a backing thickness sensing subsystem 65, a tuft height and tuft density sensing subsystem 70.

In one example, the downstream segmented shear subsystem 55, offset from the upstream shear subsystem 55, would remove the backing material or face material, not removed by the upstream shear subsystem. As shown, the segmented belts or pin rollers 52', 52" nip the carpet between each segmented shear subsystem 55. In various combinations, it is contemplated that both of the upstream and the downstream shear subsystems that are positioned on both sides of the component waste separation system 40 can be rotated in the same direction or in opposing directions relative to each other. In this aspect, an upstream shear subsystem can be rotated in the machine direction of the component waste separation system 40 and the downstream shear subsystem can be rotated in a direction opposite to the machine direction of the component waste separation system 40.

Figure 2:
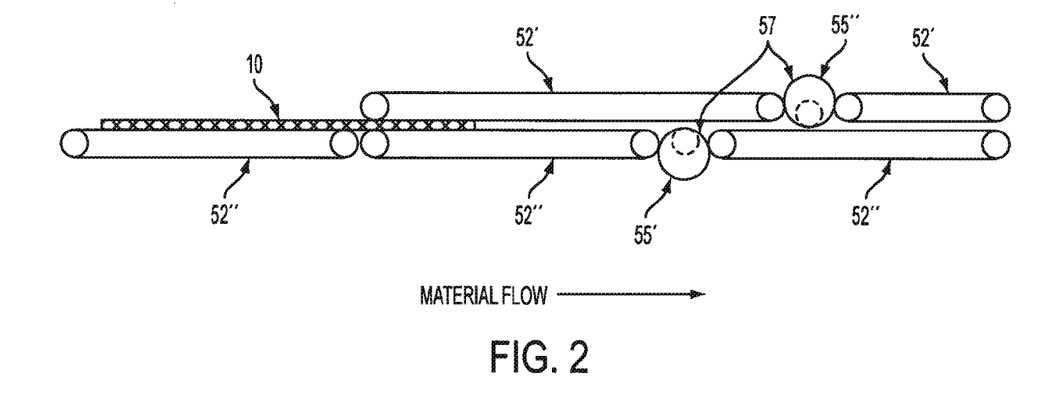
FIG. 2 is a schematic representation of an exemplary method and system for separating the constituent materials of a carpet, showing a first shear subsystem and a second, downstream, shear subsystem that are configured for separating face materials and secondary backing materials from a primary backing material of the carpet. In the illustrated example, the respective first and a second shear subsystems comprise a pair of spaced and opposed rotating shearers.

Referring to FIG. 2, the component waste separation system 40 is exemplary shown with a first shear subsystem 55' and a second, downstream, shear subsystem 55" that are configured for separating face materials and secondary backing materials from a primary backing material of the carpet. In this example, the respective first and a second shear subsystems comprise a pair of spaced and opposed rotating shearers having conventional shear surfaces. As one will appreciate, two pluralities of belts or pin rollers 52', 52" are shown are positioned substantially parallel to each other in at least partially opposing, overlapping relationship to each other.

Figure 3:
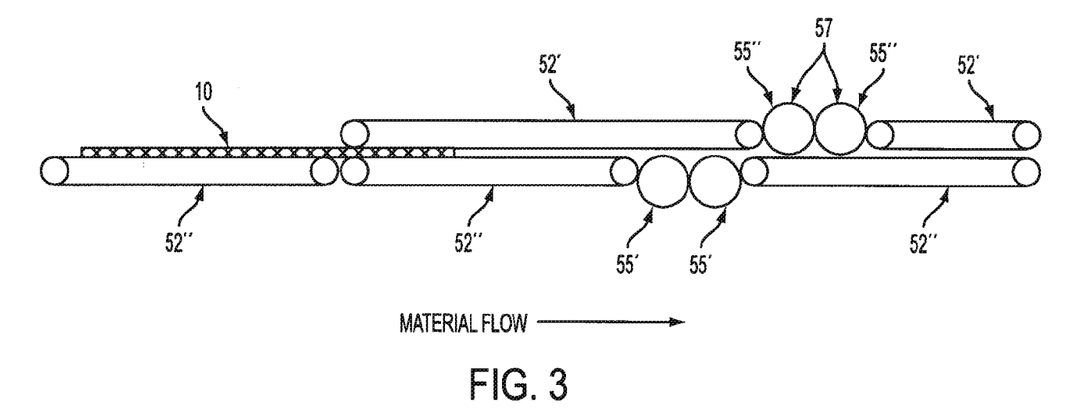
FIG. 3 is a schematic representation of an exemplary method and system for separating the constituent materials of a carpet, showing a first shear subsystem and a second, downstream, shear subsystem that are configured for separating face materials and secondary backing materials from a primary backing material of the carpet. In this example, each of the respective first and second shear subsystems comprises a pair of rotating shearers positioned adjacent to each other. Further, the second shear subsystem is positioned opposed to and downstream of the first shear subsystem.

Referring to FIG. 3, the component waste separation system 40 is exemplary shown with a first shear subsystem 55' and a second, downstream, shear subsystem 55" that are configured for separating face materials and secondary backing materials from a primary backing material of the carpet. In this example, each of the respective first and second shear subsystems comprises a pair of rotating shearers positioned adjacent to each other. Further, the second shear subsystem is positioned opposed to and downstream of the first shear subsystem. As one will appreciate, two pluralities of urging elements, e.g. belts or pin rollers 52', 52", are shown are positioned substantially parallel to each other in at least partially opposing, overlapping relationship to each other.

Figure 4:
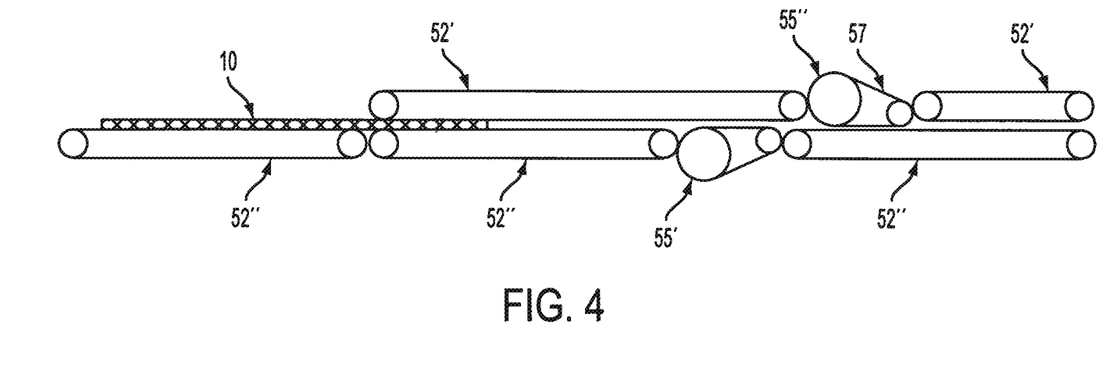
FIG. 4 is a schematic representation of an exemplary method and system for separating the constituent materials of a carpet, showing a first shear subsystem and a second, downstream, shear subsystem that are configured for separating face materials and secondary backing materials from a primary backing material of the carpet. In this example, the respective first and a second shear subsystems comprise a two pairs of spaced and opposed rotating belt-type shearers.
Figure 5:
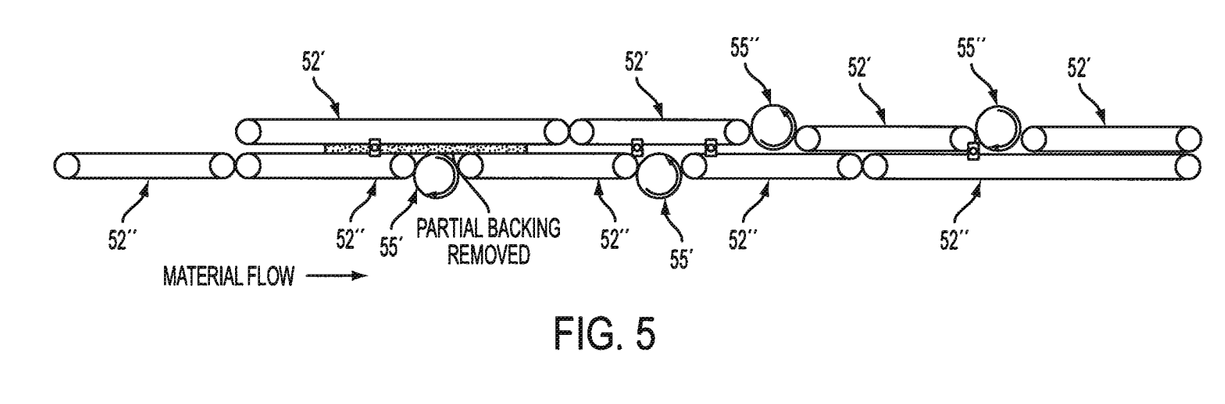
FIGS. 5-9 illustrate a schematic representation of an exemplary method and system for separating the constituent materials of a carpet, showing a first shear subsystem and a second, downstream, shear subsystem that are configured for separating face materials and secondary backing materials from a primary backing material of the carpet. In this example, each of the respective first and second shear subsystems comprises a pair of spaced rotating shearers. Further, the second shear subsystem is positioned opposed to and downstream of the first shear subsystem. In this example, it is contemplated that the backing material and the fiber material will be separated from the primary backing by sequential abrasion steps.
Figure 6:
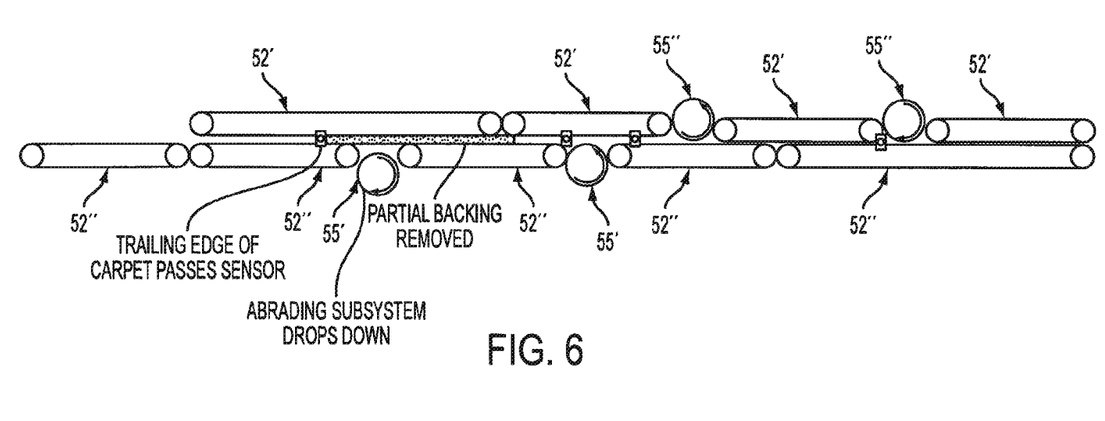
Figure 7:
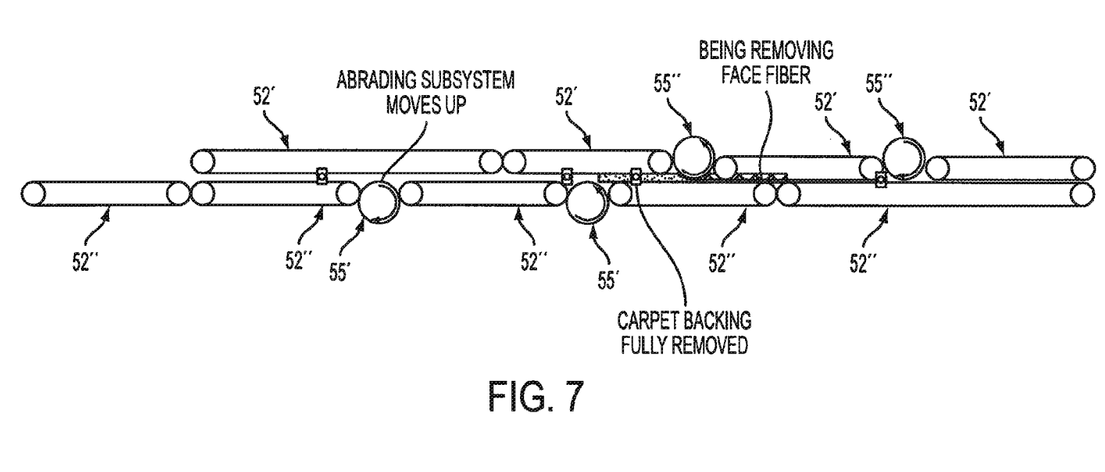
Figure 8:
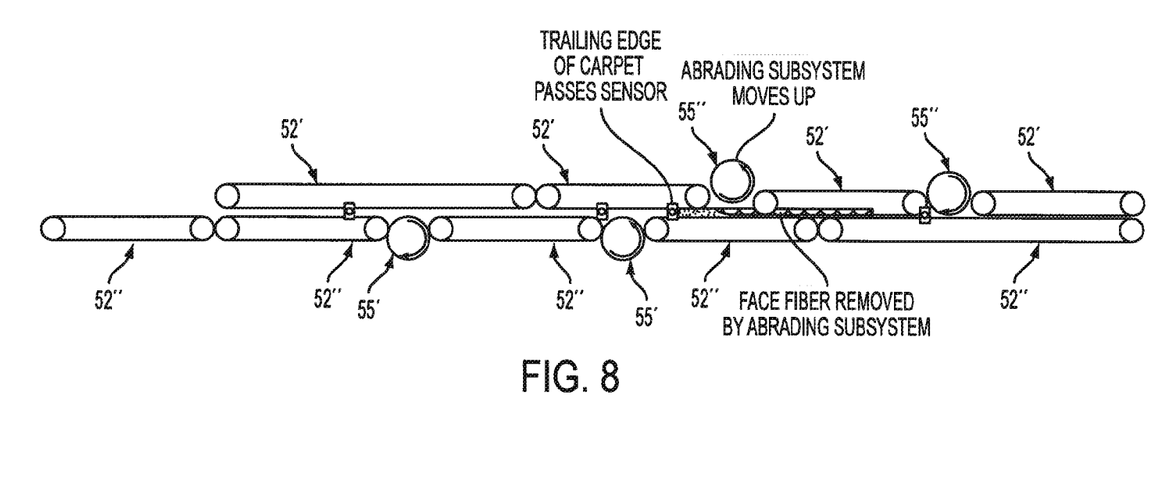
Figure 9:
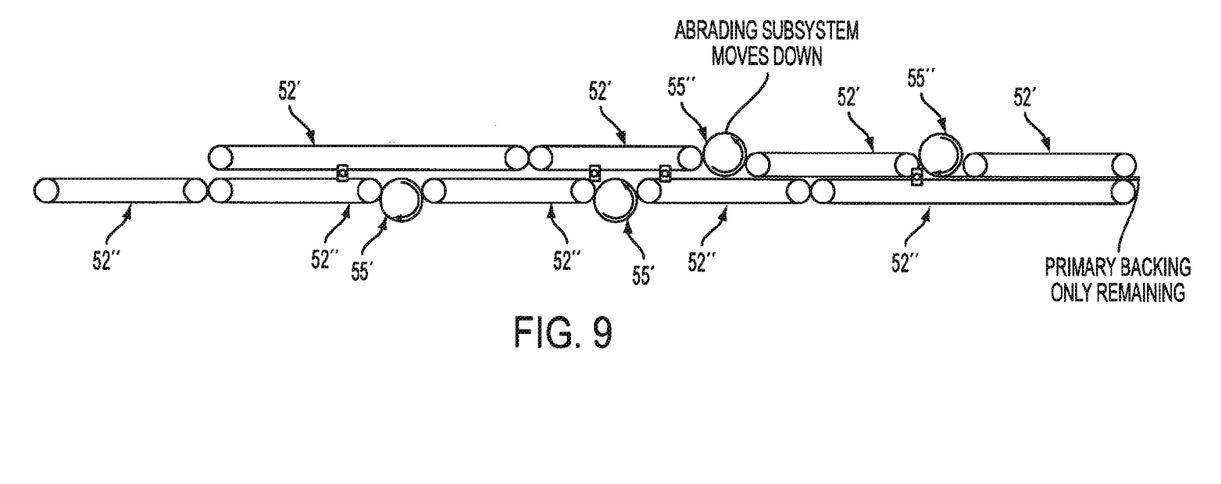

Referring to FIG. 4, the component waste separation system 40 is exemplary shown with a first shear subsystem 55' and a second, downstream, shear subsystem 55" that are configured for separating face materials and secondary backing materials from a primary backing material of the carpet. In this example, the respective first and a second shear subsystems comprise a two pairs of spaced and opposed rotating belt-type shearers. Further, the second shear subsystem is positioned opposed to and downstream of the first shear subsystem. As one will appreciate, two pluralities of belts or pin rollers 52', 52" are shown are positioned substantially parallel to each other in at least partially opposing, overlapping relationship to each other.

Referring now to FIGS. 5-9, an exemplary method and system for separating the constituent materials of a carpet is shown. As illustrated, a first shear subsystem 55' and a second, downstream, shear subsystem 55" of the component waste separation system 40 are configured for separating face materials and secondary backing materials from a primary backing material of the carpet. In this example, each of the respective first and second shear subsystems comprises a pair of spaced rotating shearers. Further, the second shear subsystem is positioned opposed to and downstream of the first shear subsystem. In this example, it is contemplated that the backing materials and the fiber materials will be separated from the primary backing by sequential shearing or abrasion steps as the carpet waste material is passed sequentially through the shear subsystems.

Figure 10:
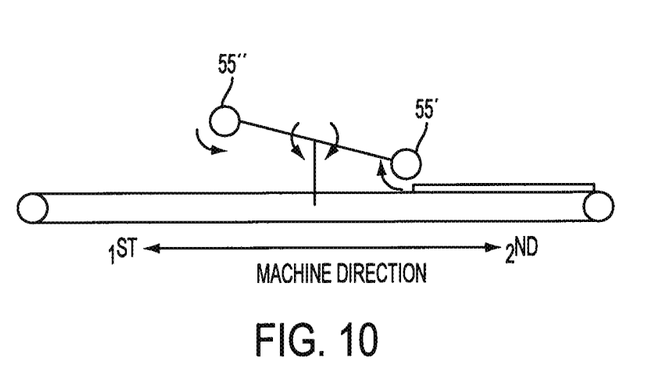
FIG. 10 is a schematic representation of an exemplary method and system for separating the constituent materials of a carpet, showing a first shear subsystem and a second, spaced, shear subsystem that are configured for separating face materials and/or secondary backing materials from a primary backing material of the carpet. In this example, the respective first and second shear subsystems comprise a pair of spaced rotating shearers and the carpet is repeatedly urged biaxially along a machine direction under the respective first and second shear subsystems until a desired degree of material is removed from the carpet.

FIG. 10 is a schematic representation of an exemplary method and system for separating the constituent materials of a carpet, showing a first shear subsystem and a second, spaced, shear subsystem that are configured for separating face materials and/or secondary backing materials from a primary backing material of the carpet. In this example, the respective first and second shear subsystems comprise a pair of spaced rotating shearers and the carpet is repeatedly urged biaxially along a machine direction under the respective first and second shear subsystems until a desired degree of material is removed from the exposed face of the carpet. In one aspect, the pair of spaced rotating shearers comprises a first rotating shearer and a second rotating shearer that is configured to rotate counter to the rotation direction of the first rotating shearer. In one aspect, in operation, piece of carpet waste is disposed onto a conveyor surface for biaxial movement along a machine direction past the first and second shear subsystems. As the edge of the carpet waste piece is urged in a first machine direction and the carpet waste piece passes under and proximate the first rotating shearer, the first rotating shearer is lowered into operative contact with the exposed material of the carpet waist piece (concurrently, the second rotating shearer is raised up and away from contact with the carpet piece). As a middle portion, or a desired portion, of the carpet piece passes under and proximate to the second rotating shearer, the second rotating shearer is lowered into operative contact with the exposed material of the carpet waist piece (concurrently, the first rotating shearer is raised up and away from contact with the carpet piece).

Subsequent to the pass of the carpet waste piece along the first machine direction, the conveyor is reversed and the carpet waste piece is urged in a second machine direction, opposite to the first machine direction. When the carpet waste piece passes under and proximate the second rotating shearer, the second rotating shearer is lowered into operative contact with the exposed material of the carpet waist piece (concurrently, the first rotating shearer is raised up and away from contact with the carpet piece). As the middle portion, or a desired portion, of the carpet piece passes under and proximate to the first rotating shearer, the first rotating shearer is lowered into operative contact with the exposed material of the carpet waist piece (concurrently, the second rotating shearer is raised up and away from contact with the carpet piece). The carpet piece is repeatedly moved biaxially under the pair of spaced rotating shearers until the desired degree of material is removed from the face of the carpet piece. Subsequently, the carpet piece can be flipped over on the conveyor and the process can be repeated to remove the desired degree of materials from the exposed face of the carpet piece.

In one aspect, it is contemplated that the first and second rotating shearers can be mounted on opposite ends of an elongated armature. In this aspect, it is contemplated that the armature can be configured in a teeter-totter configuration to be selectively rotated about an axis transverse to the machine direction to affect the desired operative engagement of the respective first and second rotating shearers.

The carpet waste size sensing subsystem 60 of the component waste separation system 40 can comprise at least one of a computer vision system, a sensor array, or a mechanical fingers (or heddles) to detect the width of each flattened carpet waste piece. The carpet waste size sensing subsystem 60 is in communication with the computer control system 80 to provide immediate and real-time system adjustments to the respective components of the component waste separation system 40 for the optimized downstream abrasion and waste stream separation. In one aspect, it is contemplated, based on input signals from the carpet waste size sensing subsystem 60, that the computer control system 80 can signal the means for selectively moving the shear subsystem, i.e., selectively signaling and adjusting pneumatic or hydraulic pressure of the shear subsystem to maintain a PSI force set-point in order to assure maximum quality, throughput and consistency.

Figure 11:
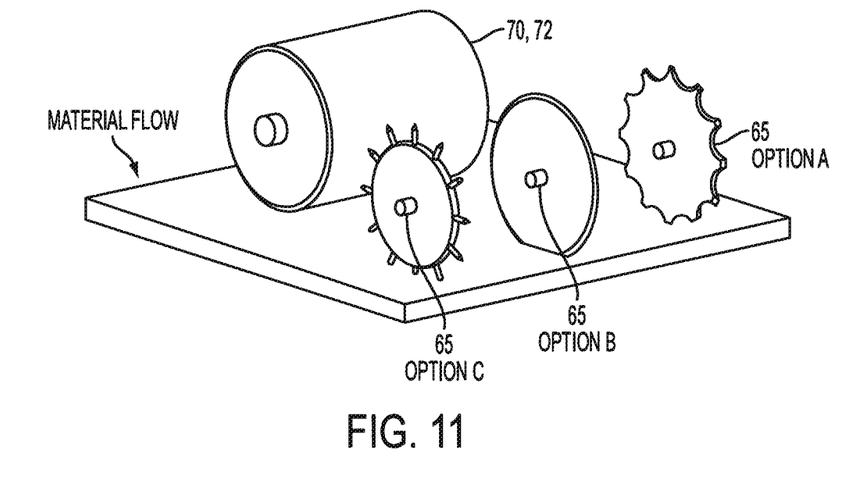
FIG. 11 is a schematic representation of exemplary methods and systems for sensing the tuft height of the fiber material, the density of the carpet, and the backing material height.

The backing thickness sensing subsystem 65 of the component waste separation system 40 can comprise means for automatically detecting the thickness of the backing material of the carpet waste piece. Referring to FIG. 11, means for automatically detecting the thickness of the backing material of the carpet waste piece can comprise at least one backing thickness sensor 67, as exemplarily illustrated. In one example, as shown in option A, the backing thickness sensor comprises a scalloped disk that is configured to roll across the face of the carpet, pressing its scalloped edge between the tufts of the carpet to establish where the backing top is in z-axis space. In another example, as shown in option B, the backing thickness sensor comprises a sharp roller, akin to a pizza cutter, which is configured to roll across the face of the carpet, pressing its sharp edge between the tufts of the carpet to establish where the backing top is in z-axis space. In another exemplary aspect, as shown in option C, the backing thickness sensor comprises a pinned wheel that is configured to roll across the face of the carpet, pressing its pins between the tufts of the carpet to establish where the backing top is in z-axis space. In another aspect of the backing thickness sensing subsystem 65, the backing thickness sensor 67 can be is mounted on a set of linear bearings or slides that is connected to a distance sensing mechanism, such as, for example and without limitation, a LVDT (Linear Velocity Displacement Transducer), a laser distance sensor, and the like. The distance signal, i.e., the backing thickness signal, is sent to the computer control system 80 for conversion and insertion into the process optimization calculations. It is contemplated that other sensing mechanisms can also be employed for the means for automatically detecting the thickness of the backing material of the carpet waste piece.

The tuft height and tuft density sensing subsystem 70 of the component waste separation system 40 can comprise means for automatically monitoring both tuft density and tuft height of the carpet waste piece. In one aspect, the means for automatically monitoring both tuft density and tuft height of the carpet waste piece can comprise monitoring a displacement distance in the z-axis substantially transverse to the machine direction of a wide width roller 72. In this aspect, and as shown in FIG. 10, a wide width roller 72 rolls on the top surface, i.e., the face material surface, of the carpet waste piece as it flows through the component waste separation system 40 in the machine direction. The roller is configured to moves up or down relative to the flat surface of the carpet waste piece depending on the relative tuft height or density of the respective carpet waste piece. In another aspect of the tuft height and tuft density sensing subsystem 70, the wide width roller 72 can be is mounted on a set of linear bearings or slides that is connected to a distance sensing mechanism, such as, for example and without limitation, a LVDT (Linear Velocity Displacement Transducer), a laser distance sensor, and the like. In a further aspect of the tuft height and tuft density sensing subsystem 70 can comprise at least one weight, such as, for example and without limitation, a 10 lb weight, that is configured to move in the z-axis into operative contact with the face of the carpet waste piece. In this configuration, the weight can be is mounted on a set of linear bearings or slides that is connected to a distance sensing mechanism, such as, for example and without limitation, a LVDT (Linear Velocity Displacement Transducer), a laser distance sensor, and the like.

The displacement distance signal, i.e., the tuft height and tuft density signal, is sent to the computer control system 80 for conversion and insertion into the process optimization calculations. It is contemplated that other sensing mechanisms can also be employed for the means for automatically monitoring both tuft density and tuft height of the carpet waste piece. It is contemplated that the respective backing thickness sensing subsystem 65 and the tuft height and tuft density sensing subsystem 70 allow for the immediate and real time adjustments of the component waste separation system 40 that are necessary for the downstream abrasion and separation process.

In one aspect, the waste stream output monitoring subsystem 75 of the component waste separation system 40 is coupled to the computer control system 80 and comprises means for monitoring the quantity output of fines and mixed fiber produced in the component waste separation system. The waste stream output monitoring subsystem 75 of the component waste separation system 40 can also comprise means for adjusting at least one of: the throughput speed of the component waste separation system 40, the speed of each of the respective shear subsystems, and the force or pressure applied by each of the respective shear subsystems thereon the carpet waste piece. The means for monitoring the quantity output of fines and mixed fiber produced in the component waste separation system can comprise conventional optical, ultrasonic, flow or gravimetric methods to monitor output during the process of shear or otherwise separating the backing material from the primary backing of the carpet waste piece. Based on the overall flow of material through the component waste separation system 40, the force or pressure applied by each of the respective shear subsystems thereon the carpet waste piece or engagement distance can be adjusted as desired. For example and without limitation, this adjustment can be also based on the rotational amperage being applied to the respective shear subsystems, which is related to a gradual loss of the effective level or degree of abrasiveness of the shear surfaces of the shear subsystems over time.

As one will appreciate from the discussion above, it is contemplated that several variables are being sensed real time in component waste separation system 40. These parameters being sensed, as data inputs, can comprise at least one of: backing thickness, pile height, pile density, incoming carpet waste material flat piece width, and shear subsystem rotational motor load. Using this input data, the computer control system 80 can selectively adjust the relative position of the respective shear subsystem to a determined engagement distance calculated by the computer control system 80 for optimal processing conditions.

In another aspect, after deconstruction of the carpet waste piece in the component waste separation system 40, each material waste stream goes through its own system to be further cleaned, separated and opened. Optionally, the face fabric waste stream can be mixed with the primary backing waste stream for subsequent processing to reduce capital expenditures. Typically, after the various carpet components have been separated, each respective waste stream requires additional processing in order to become usable material. Referring now to FIG. 1, exemplary processing of the respective waste streams as shown.

In one example, the separated face material or fiber waste stream is urged to a conventional condenser via a conventional blower system, for example, a vacuum conveyor system. The condenser is configured to remove unwanted dust and particulate matter in preparation for subsequent delivery to a conventional step cleaner. The step cleaner is configured to remove unwanted dust and particulate matter, such as, for example and without limitation, dirt, calcium carbonate, and the like, from the face material or fiber waste stream. After the step cleaner, the face material or fiber waste stream can be delivered to another conventional blower/condenser for final cleansing or removal of unwanted dust and particulate matter. Finally, the cleansed face material or fiber waste stream can be delivered to a baling station for baling. In this example, the separated unwanted dust and particulate matter is delivered to a bag house/waste facility.

In one example, the separated backing material waste stream, comprising backing material having some degree of face fiber, is delivered to a conventional cyclone separator to separate any fines from the backing material having some degree of face fiber. The separated fines are delivered downstream to the bag house/waste facility and the separated backing material having some degree of face fiber waste stream is delivered to a downstream size reduction apparatus configured to tear the waste stream material into fibrous lengths. This size reduction can optionally be repeated in a secondary downstream size reduction apparatus in preparation for subsequent delivery to a conventional step cleaner. The step cleaner is configured to remove unwanted dust and particulate matter, such as, for example and without limitation, dirt, calcium carbonate, and the like, from the backing material having some degree of face fiber waste stream. After the step cleaner, the cleansed backing material having some degree of face fiber waste stream is delivered to a conventional cutter configured chop or reduce the fibrous materials to a desired length. After the cutter, the backing material having some degree of face fiber waste stream is urged to a conventional condenser configured to remove unwanted dust and particulate matter in preparation for sequential delivery to a conventional fine opener and step cleaner. The respective fine opener and step cleaner is configured to remove unwanted dust and particulate matter, such as, for example and without limitation, dirt, calcium carbonate, and the like, from the backing material having some degree of face fiber waste stream. Finally, the cleansed backing material having some degree of face fiber waste stream can be delivered to a baling station for baling. As in the previous example, the separated unwanted dust and particulate matter is delivered to a bag house/waste facility.

In one example, the separated primary backing material waste stream is delivered to a downstream size reduction apparatus via a conventional conveyor system that configured to configured to meter and control the supply of the primary backing material waste stream to the downstream size reduction apparatus. In one aspect, the downstream size reduction apparatus is configured to tear the waste stream material into fibrous lengths. This size reduction can optionally be repeated in a secondary downstream size reduction apparatus in preparation for subsequent delivery to a conventional step cleaner. The step cleaner is configured to remove unwanted dust and particulate matter, such as, for example and without limitation, dirt, calcium carbonate, and the like, from the primary backing material waste stream. After the step cleaner, the cleansed primary backing material waste stream is delivered to a conventional cutter configured chop or reduce the fibrous materials to a desired length. After the cutter, the primary backing material waste stream is urged to a conventional condenser configured to remove unwanted dust and particulate matter in preparation for sequential delivery to a conventional fine opener and step cleaner. The respective fine opener and step cleaner is configured to remove unwanted dust and particulate matter, such as, for example and without limitation, dirt, calcium carbonate, and the like, from the primary backing material waste stream. Finally, the cleansed primary backing material waste stream can be delivered to a baling station for baling. As in the previous examples, the separated unwanted dust and particulate matter is delivered to a bag house/waste facility.

Without limitation the conventional cleaning equipment described above can be purchased from Dell Orco & Villani Srl, Vecoplan, Wilson Knowles and Sons Ltd, Southern Mechatronics, Signal Machine Company Inc, Kice Industries Inc, Sterling Systems Inc, Pallmann GmbH, OMMI SpA, Pierret Industries Sprl, eFactor 3 LLC, Tria SpA, Weima America Inc, SSI Shredding Systems Inc, Erko-Trützschler GmbH, LaRoche S A, Margasa S L, Schirp, Chiavazza Vergnasco, Timtex GmbH, and others. Conventional cleaning equipment can comprise, without limitation, step cleaners, willows, cyclone separators, vertical vibrating chutes, horizontal vibratory screeners, multi-aspirators, rotary sifters, condensers, guillotine and rotary cutters, fine opening, tearing and other methods of cleaning.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the described invention.

What is claimed is:

1. A system for reclaiming secondary backing materials, primary backing materials, and face materials, from carpet waste pieces, comprising:
    a component waste separation system comprising:
        a plurality of shear subsystems comprising a first shear subsystem and a second shear subsystem, wherein the first shear subsystem is configured to contact incoming carpet waste pieces to remove or otherwise separate the secondary backing materials from the primary backing material of the carpet waste pieces, and wherein the second shear subsystem is configured to contact incoming carpet waste pieces to remove or otherwise separate the face materials from the primary backing material of the carpet waste pieces; and
    a tractor feed subsystem.

2. The system of claim 1, wherein the component waste separation system further comprises at least one of: a carpet waste size sensing subsystem, a backing thickness sensing subsystem, a tuft height and tuft density sensing subsystem, and a waste stream output monitoring subsystem.

3. The system of claim 2, further comprising means for selectively adjusting the relative position of the respective shear subsystem to a determined engagement distance.

4. The system of claim 2, wherein the carpet waste materials comprises at least one of: post-consumer carpet, post-consumer processed carpet; post-industrial carpet, manufacturing remnants, and quality control carpet failures.

5. The system of claim 4, wherein the face materials comprise face fiber.

6. The system of claim 2, wherein the carpet waste materials comprises at least one of: tufted carpet, needle-punched carpet, and hand woven carpet.

7. The system of claim 2, wherein the carpet waste materials comprises at least one of: tufted carpet, needle-punched carpet, and hand woven carpet.

8. The system of claim 2, further comprises an infeed conveyor system that is positioned upstream of the component waste separation system, the infeed conveyor system comprising a means for removing wrinkles from each carpet waste piece that is feed into the system.

9. The system of claim 8, wherein the infeed conveyor system further comprises a means for selectively applying a desired pressure transverse to the downstream machine directional flow to the individual carpet waste pieces passing through the infeed conveyor system.

10. The system of claim 1, wherein the tractor feed subsystem comprises means for selectively indexing individual flattened pieces of carpet waste through the component waste separation system, wherein the means for selectively indexing individual flattened pieces of carpet waste through the component waste separation system is configured to nip the carpet as it is moved in the downstream machine direction to effect the desired control of the orientation and metering of the carpet waste material at a specified rate.

11. The system of claim 10, wherein the specified rate is selectively controlled as desired for the respective carpet waste material that is passing therethough the component waste separation system.

12. The system of claim 10, the means for selectively indexing individual flattened pieces of carpet waste through the component waste separation system comprises a plurality of urging elements that are configured to maintain the individual carpet waste materials in a desired orientation while moving or otherwise urging the carpet waste material through the plurality of shear subsystems.

13. The system of claim 12, wherein each plurality of urging elements is selected from a plurality of belts and a plurality of pin rollers.

14. The system of claim 12, wherein the plurality urging elements comprises two pluralities of urging elements, wherein each plurality urging elements are positioned substantially parallel to each other and the two pluralities of urging elements are positioned, at least partially, in opposing, overlapping relationship to each other.

15. The system of claim 14, wherein each plurality of urging elements can also comprise a means for selectively applying desired pressure transverse to the downstream machine directional flow, to the individual carpet waste pieces in order to maintain the desired nip and to prevent slippage of the individual carpet waste pieces.

16. The system of claim 1, wherein each of the shear subsystems is selected from a rotating shearer and a belt-type shearer.

17. The system of claim 16, wherein at least one of the shear subsystems comprises a blade shear system that is configured to remove a desired portion of the face material as the carpet waste pieces are continuously and linearly moved downstream through the component waste separation system.

18. The system of claim 16, wherein the rotating shearer is selected from a continuous rotating shearer or a segmented rotating shearer.

19. The system of claim 18, wherein at least a portion of each rotating shearer has an abrasion surface having a grit surface that is bonded or otherwise coupled to at least a portion of an exterior surface of the shearer.

20. The system of claim 1, wherein the component waste separation system further comprises a carpet waste size sensing subsystem, wherein the carpet waste size sensing subsystem comprises at least one of a computer vision system, a sensor array, and mechanical fingers to detect the width of each carpet waste piece.

21. The system of claim 1, wherein the component waste separation system further comprises a backing thickness sensing subsystem that is configured to detect the thickness of the primary backing materials of the carpet waste piece.

22. The system of claim 21, wherein backing thickness sensing subsystem comprises at least one backing thickness sensor.

23. The system of claim 22, further comprising a set of linear bearings that is connected to a distance sensing mechanism, wherein the backing thickness sensor is mounted on the set of linear bearings.

24. The system of claim 1, wherein the component waste separation system further comprises a tuft height and tuft density sensing subsystem that comprises a means for automatically monitoring both tuft density and tuft height of the carpet waste piece.

25. The system of claim 24, wherein the means for automatically monitoring both tuft density and tuft height of the carpet waste piece comprises monitoring a displacement distance in the z-axis substantially transverse to the machine direction of a wide width roller that is configured to roll over the face material of the carpet waste piece.

26. The system of claim 25, further comprising a set of linear bearings that is connected to a distance sensing mechanism, wherein the wide width roller is mounted on the set of linear bearings.

27. The system of claim 1, wherein the component waste separation system further comprises a waste stream output monitoring subsystem.

28. A method of reclaiming secondary backing materials, primary backing materials, and face materials, from carpet waste pieces, comprising:
removing wrinkles from each carpet waste piece that is feed into a component waste separation system, wherein the wrinkles are removed upstream of the component waste separation system; and
selectively feeding carpet waste pieces into a component waste separation system comprising:
a plurality of shear subsystems comprising a first shear subsystem and a second shear subsystem, wherein the first shear subsystem is configured to contact the incoming carpet waste pieces to remove or otherwise separate the secondary backing materials from the primary backing material of the carpet waste pieces, and wherein the second shear subsystem is configured to contact the incoming carpet waste pieces to remove or otherwise separate the face fiber or face materials from the primary backing material of the carpet waste pieces.

29. The method of claim 28, further comprising selectively applying a desired pressure transverse to the downstream machine directional flow to the individual carpet waste pieces passing through the infeed conveyor system.

30. The method of claim 29, further comprising selectively indexing individual flattened pieces of carpet waste through the component waste separation system.

31. The method of claim 30, further comprising selectively applying desired pressure transverse to the downstream machine directional flow, to the individual carpet waste pieces in order to maintain the desired nip and to prevent slippage of the individual carpet waste pieces.

32. The method of claim 31, further comprising automatically detecting the thickness of the backing material of the carpet waste piece.

33. The method of claim 32, further comprising automatically monitoring both tuft density and tuft height of the carpet waste piece.

34. The method of claim 33, further comprising selectively adjusting the relative position of the respective shear subsystems to a determined engagement distance.

35. The method of claim 34, further comprising monitoring the waste stream.

36. A system for reclaiming secondary backing materials, primary backing materials, and face materials, from carpet waste pieces, comprising:
a component waste separation system comprising:
a plurality of shear subsystems comprising a first shear subsystem and a second shear subsystem, wherein the first shear subsystem is configured to contact incoming carpet waste pieces to remove or otherwise separate the secondary backing materials from the primary backing material of the carpet waste pieces, and wherein the second shear subsystem is configured to contact incoming carpet waste pieces to remove or otherwise separate the face materials from the primary backing material of the carpet waste pieces; and
a carpet waste size sensing subsystem, wherein the carpet waste size sensing subsystem comprises at least one of a computer vision system, a sensor array, and mechanical fingers to detect the width of each carpet waste piece.

37. The system of claim 36, wherein the component waste separation system further comprises at least one of: a tractor feed subsystem, a backing thickness sensing subsystem, a tuft height and tuft density sensing subsystem, and a waste stream output monitoring subsystem.

38. A system for reclaiming secondary backing materials, primary backing materials, and face materials, from carpet waste pieces, comprising:
a component waste separation system comprising:
a plurality of shear subsystems comprising a first shear subsystem and a second shear subsystem, wherein the first shear subsystem is configured to contact incoming carpet waste pieces to remove or otherwise separate the secondary backing materials from the primary backing material of the carpet waste pieces, and wherein the second shear subsystem is configured to contact incoming carpet waste pieces to remove or otherwise separate the face materials from the primary backing material of the carpet waste pieces; and
a backing thickness sensing subsystem that is configured to detect the thickness of the primary backing materials of the carpet waste piece.

39. The system of claim 38, wherein the component waste separation system further comprises at least one of a tractor feed subsystem, a carpet waste size sensing subsystem, a tuft height and tuft density sensing subsystem, and a waste stream output monitoring subsystem.

40. A system for reclaiming secondary backing materials, primary backing materials, and face materials, from carpet waste pieces, comprising:
a component waste separation system comprising:
a plurality of shear subsystems comprising a first shear subsystem and a second shear subsystem, wherein the first shear subsystem is configured to contact incoming carpet waste pieces to remove or otherwise separate the secondary backing materials from the primary backing material of the carpet waste pieces, and wherein the second shear subsystem is configured to contact incoming carpet waste pieces to remove or otherwise separate the face materials from the primary backing material of the carpet waste pieces; and a tuft height and tuft density sensing subsystem that comprises a means for automatically monitoring both tuft density and tuft height of the carpet waste piece.

41. The system of claim 40, wherein the component waste separation system further comprises at least one of: a tractor feed subsystem, a carpet waste size sensing subsystem, a backing thickness sensing subsystem, and a waste stream output monitoring subsystem.

42. A system for reclaiming secondary backing materials, primary backing materials, and face materials, from carpet waste pieces, comprising:

a component waste separation system comprising:

a plurality of shear subsystems comprising a first shear subsystem and a second shear subsystem, wherein the first shear subsystem is configured to contact incoming carpet waste pieces to remove or otherwise separate the secondary backing materials from the primary backing material of the carpet waste pieces, and wherein the second shear subsystem is configured to contact incoming carpet waste pieces to remove or otherwise separate the face materials from the primary backing material of the carpet waste pieces;

a waste stream output monitoring subsystem; and at least one of: a tractor feed subsystem, a carpet waste size sensing subs stem, a backing thickness sensing subsystem, and a tuft height and tuft density sensing subsystem.

43. A system for reclaiming secondary backing materials, primary backing materials, and face materials, from carpet waste pieces, comprising:

a component waste separation system comprising:

a plurality of shear subsystems comprising a first shear subsystem and a second shear subsystem, wherein the first shear subsystem is configured to contact incoming carpet waste pieces to remove or otherwise separate the secondary backing materials from the primary backing material of the carpet waste pieces, and wherein the second shear subsystem is configured to contact incoming carpet waste pieces to remove or otherwise separate the face materials from the primary backing material of the carpet waste pieces; and at least one of a tractor feed subsystem, a carpet waste size sensing subsystem, a backing thickness sensing subsystem, a tuft height and tuft density sensing subsystem, and a waste stream output monitoring subsystem; and an infeed conveyor system that is positioned upstream of the component waste separation system, the infeed conveyor system comprising a means for removing wrinkles from each carpet waste piece that is feed into the system.

* * * * *